(12) United States Patent
Mintz et al.

(10) Patent No.: US 7,729,978 B2
(45) Date of Patent: Jun. 1, 2010

(54) SYSTEM AND METHOD FOR DYNAMICALLY CHANGING AN ELECTRONIC TRADE ORDER QUANTITY

(75) Inventors: Sagy P. Mintz, Lincolnshire, IL (US); Michael J. Burns, Riverside, IL (US); Thomas A. Peterson, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 119 days.

(21) Appl. No.: 11/692,284

(22) Filed: Mar. 28, 2007

(65) Prior Publication Data

US 2008/0243709 A1 Oct. 2, 2008

(51) Int. Cl.
*G06Q 40/00* (2006.01)
(52) U.S. Cl. .......................................... 705/37; 705/35
(58) Field of Classification Search .................... 705/37, 705/35
See application file for complete search history.

(56) References Cited

U.S. PATENT DOCUMENTS

| | | | | |
|---|---|---|---|---|
| 6,938,011 | B1* | 8/2005 | Kemp et al. | 705/37 |
| 7,113,924 | B2* | 9/2006 | Fishbain | 705/37 |
| 7,246,093 | B1* | 7/2007 | Katz | 705/37 |
| 7,366,691 | B1* | 4/2008 | Kemp et al. | 705/35 |
| 7,392,219 | B2* | 6/2008 | Singer et al. | 705/37 |
| 7,424,450 | B2* | 9/2008 | Kemp et al. | 705/35 |
| 7,542,941 | B1* | 6/2009 | Cohen | 705/37 |
| 7,571,134 | B1* | 8/2009 | Burns et al. | 705/37 |
| 7,574,391 | B1* | 8/2009 | Monroe et al. | 705/36 R |
| 2002/0169703 | A1* | 11/2002 | Lutnick et al. | 705/37 |
| 2002/0178104 | A1* | 11/2002 | Hausman | 705/37 |
| 2003/0130925 | A1* | 7/2003 | Malitzis | 705/37 |
| 2003/0130929 | A1* | 7/2003 | Waddell | 705/37 |
| 2003/0177086 | A1* | 9/2003 | Gomber et al. | 705/37 |
| 2003/0200167 | A1* | 10/2003 | Kemp et al. | 705/37 |
| 2003/0236737 | A1* | 12/2003 | Kemp et al. | 705/37 |
| 2004/0153393 | A1* | 8/2004 | West et al. | 705/37 |
| 2004/0193526 | A1* | 9/2004 | Singer et al. | 705/37 |
| 2004/0243505 | A1* | 12/2004 | Sweeting et al. | 705/37 |
| 2005/0027635 | A1* | 2/2005 | Monroe et al. | 705/37 |
| 2005/0149428 | A1* | 7/2005 | Gooch et al. | 705/37 |
| 2005/0154668 | A1* | 7/2005 | Burns et al. | 705/37 |
| 2005/0171890 | A1* | 8/2005 | Daley et al. | 705/37 |
| 2005/0222937 | A1* | 10/2005 | Coad et al. | 705/37 |
| 2006/0010066 | A1* | 1/2006 | Rosenthal et al. | 705/37 |

(Continued)

OTHER PUBLICATIONS

International Search Report for PCT/US0856623.

*Primary Examiner*—Jagdish N Patel
*Assistant Examiner*—Kenneth Bartley
(74) *Attorney, Agent, or Firm*—McDonnell Boehnen Hulbert & Berghoff LLP

(57) ABSTRACT

A system and methods for dynamically changing a trade order quantity in an electronic trading environment are described herein. According to one example embodiment, an automated trading tool determines if a leaned on quantity of a trading strategy has increased or decreased and if so, dynamically changing a desired order quantity to reflect the change in the leaned on quantity. Dynamically changing an order quantity may be more profitable for a trader as order queue position may be maintained and portion of the desired order quantity may get filled; rather than a trader losing their order queue position and/or taking a chance of not getting any of their order quantity filled.

38 Claims, 8 Drawing Sheets

U.S. PATENT DOCUMENTS

| | | |
|---|---|---|
| 2006/0015436 A1* | 1/2006 | Burns et al. .................... 705/37 |
| 2006/0059068 A1* | 3/2006 | Glinberg et al. ............... 705/35 |
| 2006/0080223 A1* | 4/2006 | Rosenthal et al. ............. 705/37 |
| 2006/0089920 A1* | 4/2006 | Ramesh et al. .............. 705/400 |
| 2006/0129475 A1* | 6/2006 | Badenhorst et al. ........... 705/37 |
| 2006/0253373 A1* | 11/2006 | Rosenthal et al. ............. 705/37 |
| 2006/0259407 A1* | 11/2006 | Rosenthal et al. ............. 705/37 |
| 2006/0259412 A1 | 11/2006 | Kemp, II et al. |
| 2006/0265314 A1* | 11/2006 | Singer et al. ................... 705/37 |
| 2006/0271468 A1* | 11/2006 | Rosenthal et al. ............. 705/37 |
| 2006/0277136 A1 | 12/2006 | O'Connor et al. |
| 2006/0277137 A1 | 12/2006 | Claus et al. |
| 2007/0011081 A1* | 1/2007 | Bok et al. ...................... 705/37 |
| 2007/0078749 A1* | 4/2007 | Burns et al. .................... 705/37 |
| 2007/0078752 A1* | 4/2007 | Burns et al. .................... 705/37 |
| 2007/0112665 A1* | 5/2007 | Mackey et al. ................. 705/37 |
| 2008/0077521 A1* | 3/2008 | Sibley et al. ................... 705/37 |
| 2008/0162378 A1* | 7/2008 | Levine et al. ............. 705/36 R |
| 2008/0243709 A1* | 10/2008 | Mintz et al. .............. 705/36 R |
| 2008/0288390 A1* | 11/2008 | Maynard ...................... 705/37 |
| 2008/0288391 A1* | 11/2008 | Downs et al. .................. 705/37 |
| 2009/0006244 A1* | 1/2009 | Kemp et al. ................... 705/37 |

* cited by examiner

FIG. 8

SYSTEM AND METHOD FOR DYNAMICALLY CHANGING AN ELECTRONIC TRADE ORDER QUANTITY

FIELD OF INVENTION

The present invention is directed to electronic trading. More specifically, the present invention is directed towards dynamically changing an order quantity in an electronic trading environment.

BACKGROUND

Electronic trading is generally based on a host exchange, one or more computer networks, and client devices. In general, the host exchange includes one or more centralized computers to form the electronic heart. Its operations typically include maintaining an exchange order book that records unexecuted orders, order matching, providing price and order fill information, and managing and updating a database that records such information. The host exchange is also equipped with an external interface that maintains contact to the client devices and possibly other trading-related systems.

Sometimes, on their machines, traders use automated or semi-automated trading tools, collectively hereinafter referred to as automated tools, that automatically or semi-automatically send orders to the exchange. Such trading tools are usually provided, among other things, to facilitate fast and accurate order entry. For instance, an automated tool might quickly calculate one or more order parameters, such as an order price or order quantity, based on market conditions or some other reference condition, and then automatically send an order with these parameters to an exchange for matching. According to many existing and popular exchanges today, orders are electronically entered in an exchange order book in the sequence in which they are entered into the market (a first-in, first-out, commonly referred to as FIFO matching system). Based on this sequence and the availability of market quantity, orders are filled with priority given to the first order entered, then the second (next) order entered, and so forth. Different variations of FIFO or different matching systems altogether can be used as well.

In addition to trading individual tradeable objects, many traders often implement trading strategies that involve simultaneous trading of two or more tradeable objects. One such trading strategy is commonly referred to as spread trading. In general, spread trading is the buying and/or selling of one, two, or more tradeable objects, one purpose of which is to capitalize on changes or movements in the relationships between the tradeable objects. The tradeable objects that are used to complete a spread are referred to as the outright markets or legs of the spread. A spread trade could involve buying tradeable objects, buying and selling tradeable objects, selling tradeable objects or some combination thereof.

As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

A commercially available trading tool that facilitates the automatic trading of spreads is Autospreader™ from Trading Technologies International, Inc. of Chicago, Ill. Once the legs of the spread are chosen and the relationship between them are defined, a user can input a desired spread price and quantity, and the Autospreader™ will automatically work orders in the legs to achieve the desired spread (or attempt to achieve the spread). The Autospreader™ is currently an add-on tool available with X_TRADER® Pro™, which is a trading application also available from Trading Technologies International, Inc.

U.S. patent application Ser. No. 10/137,979, entitled, "System and Method for Performing Automatic Spread Trading," filed on May 3, 2002, the contents of which are fully incorporated by reference herein, describes an automated spread trading tool. An example also is provided herein to illustrate how an automated spread trading tool like that described in the above incorporated application might work.

Using an automated trading tool such as Autospreader™, a trader can input a price to buy or sell the spread, and the automated trading tool will automatically work orders in the legs to achieve, or attempt to achieve the trader's desired price for the spread. For instance, a trader might define buying a spread as buying in leg A and selling in leg B. According to that definition, if the trader inputs a desired price to buy the spread, the automated trading tool will place a buy order in leg A, based on the best price that a sell order could be filled at in leg B. The best price in leg B is also known as the price that the buy order in leg A is based on. However, that price is determined based on the quantity available at that price, which is commonly referred to as the "leaned on" quantity. The instant that the order in leg A is filled, the automated trading tool submits a sell order to leg B at the current best bid price.

As the market in leg B moves, the order in leg A may be re-priced to achieve the desired spread price. Re-pricing an order typically involves canceling the existing order and replacing it with a new order at another price. While effective for achieving a desired spread price, re-pricing can result in the new order being placed at the end of an order queue corresponding to the order's new price at the electronic exchange. If, the new order loses queue position, then it may decrease the likelihood that the order will get filled, that the trader will get "legged up", and the trading strategy will fail. Additionally, one or more transaction fees are often charged by the electronic exchange for re-pricing the order.

It is beneficial to provide an automated or semi-automated trading tool that offers a more efficient method for increasing the likelihood that a trade order will get filled at the original desired order price in an electronic trading environment.

SUMMARY

To address these and other objectives, the example embodiments comprise system and methods for dynamically changing an order quantity in an electronic trading environment. There are many instances, when an automated or semi-automated trading tool, hereinafter referred to as an automated trading tool, is watching or leaning on available quantities and prices in another leg. In other words, the automated trading tool may use this "leaned on" quantity, associated with one or more price levels, when implementing its trading strategy. Dynamically changing an order quantity allows for order quantity to be automatically increased or decreased to reflect the "leaned on" quantity. A dynamic change in quantity can increase the likelihood that the order is filled at the desired order price and that the order queue position is maintained.

Aspects of the system and methods are based on a concept that it may be more profitable for a trader to maintain order queue position and possibly get a portion of their desired order quantity filled, rather than lose their order queue position and/or take the chance of not getting any of their order quantity filled. For example, a trader enters a buy spread order at a price of "–1" for a quantity of "1000." Based on the conventional function of an automated trading tool such as AutoSpreader™, a buy order for a quantity of "1000" will be placed in leg A at a price of "99" based on the best bid price in leg B which is currently at a price of "100" with a quantity of "820". However, the leaned on quantity of "820" at the price of "100" in leg B is insufficient for the desired quantity of "1000" to be filled. To avoid becoming "legged up", a conventional function of the automated trading tool would re-price the order in leg A to a price level at which the full quantity of "1000" could be satisfied, thereby giving up the valuable queue position and perhaps sacrificing a price.

However, based on the example embodiments described herein which preferably maintain the original queue position, instead of re-pricing the order to a price level where a quantity of "1000" may be available, the desired order quantity of "1000" is dynamically changed such that a portion of the quantity may be filled at the desired price without a change in queue position. Specifically, because a quantity of "820" is available at the price of "100" in leg B, the quantity of the order in leg A is dynamically changed to "820." This dynamic change in quantity results in the majority of the desired order quantity being filled at the desired price while maintaining the original order queue position.

Alternatively, if the leaned on quantity in leg B was "1250", the desired order quantity may be dynamically increased to reflect the leaned on quantity. In this instance, the desired order quantity may be increased to "1250". While order queue position may not necessarily be maintained in this instance, this dynamic increase in quantity could increase the profitability of the order, if filled.

In an alternative embodiment, a trader may set a decrease parameter that defines when a trade order quantity is dynamically decreased. The decrease parameter may be defined as percentage value or an integer value. For example, the decrease parameter may be defined as "50%". A decrease parameter of "50%" means that the leaned on quantity may be decreased up to "50%", while still being worthwhile for the trader to maintain the working order at the desired order price and the correspondingly decreased desired quantity. The decrease in the desired quantity is based, in part, on a decrease in the leaned on quantity. However, if the leaned on quantity decreased by more than "50%", then the automated trading tool may instead choose to re-price the order, as it may not be as profitable for the trader to maintain the order at the desired price level while sacrificing the majority of their desired order quantity.

Similarly, a trader may set an increase parameter that defines when a trade order quantity is dynamically increased. The increase parameter may be defined as percentage value or an integer value. For example, the increase parameter may be defined as "25%". An increase parameter of "25%" means that if the leaned on quantity increased by "25%" or more, then the desired order quantity would be correspondingly increased as well. However, if the leaned on quantity increased by less than "25%" or a percentage less than the increase parameter, then the automated trading tool may instead choose to maintain the current desired order quantity and current queue position.

As stated above, the decrease and increase parameters can also be defined as an integer value. For example, a decrease parameter defined as a value of "20" means that the leaned on quantity can decrease a maximum of "20" before the order would be re-priced. Similarly, an increase parameter defined as a value of "20" means that the leaned on quantity must increase by at least "20" before the desired order quantity will be dynamically increased. In certain embodiments, the increase/decrease parameters may be specified with respect to the desired order quantity rather than the leaned on quantity.

The above example system and methods illustrate a way to dynamically change an order quantity in an electronic trading environment. Other examples are provided herein. Modifications may also be made to the system and methods without departing from the spirit or scope of the invention. Additional features and advantages of the example embodiments will be set forth in the description that follows. The features and advantages of the example embodiment may be realized and obtained through the embodiments particularly pointed out in the appended claims. These and other features will become more fully apparent from the following description, figures, and appended claims, or may be learned by the practice of the example embodiments as set forth hereinafter.

BRIEF DESCRIPTION OF THE DRAWINGS

Example embodiments are described herein with reference to the following drawings, in which:

FIG. 8 is a block diagram illustrating a trading screen that demonstrates an example method for dynamically increasing an order quantity according to an example embodiment.

DETAILED DESCRIPTION

I. A First Example Trading System

Figure 1:
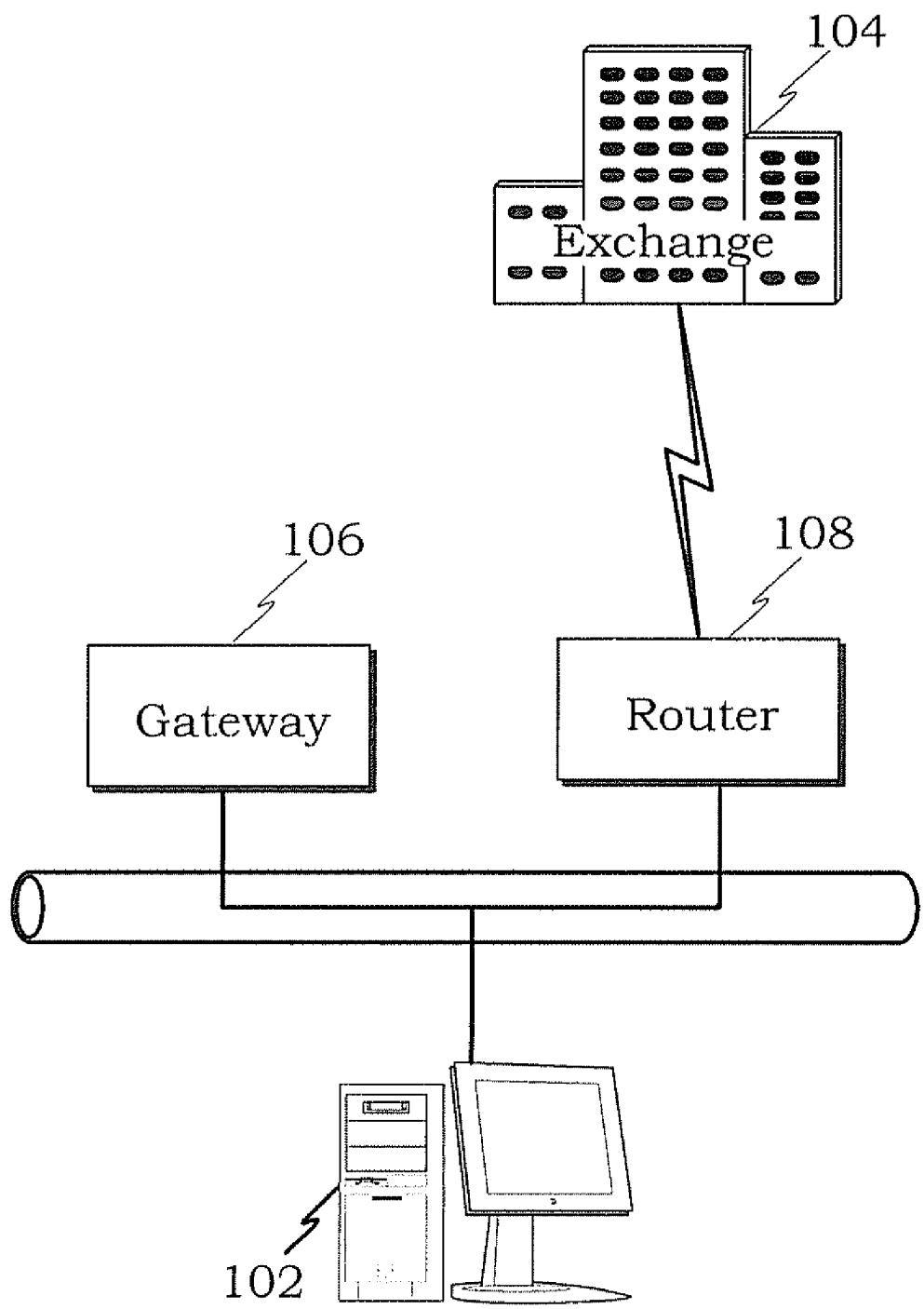
FIG. 1 illustrates an example electronic trading system for trading according to an example embodiments, wherein the trading system includes a trading station where a trader can submit bids and offers for a tradeable object being traded at an electronic exchange.

FIG. 1 illustrates an example electronic trading system in which the example embodiments may be employed. However, it should be understood that the example embodiments could be equally applicable in different embodiments and in relation to different systems as well, such as by other computer programs or systems that do not necessarily relate to electronic trading (e.g., operating systems, gaming systems, and/or other software applications). In this example, the trading system comprises a client device 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the client device 102 with orders from other client devices (not shown). The electronic exchange 104 may list one or more tradeable objects for trading. While not shown in FIG. 1 for the sake of clarity, the trading system may include other devices that are specific to the client site like middleware and security measures like firewalls, hubs, security managers, and so on, as understood by a person skilled in the art.

Regardless of the types of order execution algorithms used, the electronic exchange 104 provides market information to the subscribing client device 102. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually, although not necessarily, provided by the host exchange in aggregate sums. In other words, an exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, the exchange 104 can offer other types of market information such as the last traded price (LTP), the last traded quantity (LTQ), and order fill information.

The computer employed as the client device 102 generally can range from a hand-held device, laptop, or personal computer to a larger computer such as a workstation with multiple multiprocessors. Generally, the client device 102 includes a monitor (or any other output device) and an input device, such as a keyboard, a trackball, and/or a two or three-button mouse to support click based trading, if so desired. One skilled in the art of computer systems will understand that the present example embodiments are not limited to any particular class or model of computer employed for the client device 102 and will be able to select an appropriate system.

The computer employed as the gateway 106 generally can range from a personal computer to a larger or faster computer. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a client device or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

In general, it should be understood that the devices described herein could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data.

It should also be noted that the client device 102 generally executes application programs resident at the client device 102 under the control of the operating system of the client device 102. Also, the gateway 106 executes application programs resident at the gateway 106 under the control of the operating system of the gateway 106. In other embodiments and as understood by a person skilled in the art, the function of the application programs at the client device 102 may be performed by the gateway 106, and likewise, the function of the application programs at the gateway 106 may be performed by the client device 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means besides a T1, T3, or ISDN. In yet another example illustration, the gateway may be housed at, or near, its corresponding electronic exchange. According to this instance, the client device may communicate with the gateway over a wide area network or through the use of a T1, T3, ISDN, or some other high speed connection.

Further, the gateway may be located remote from the client device and remote from the electronic exchange, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

II. A Second Example Trading System

Figure 2:
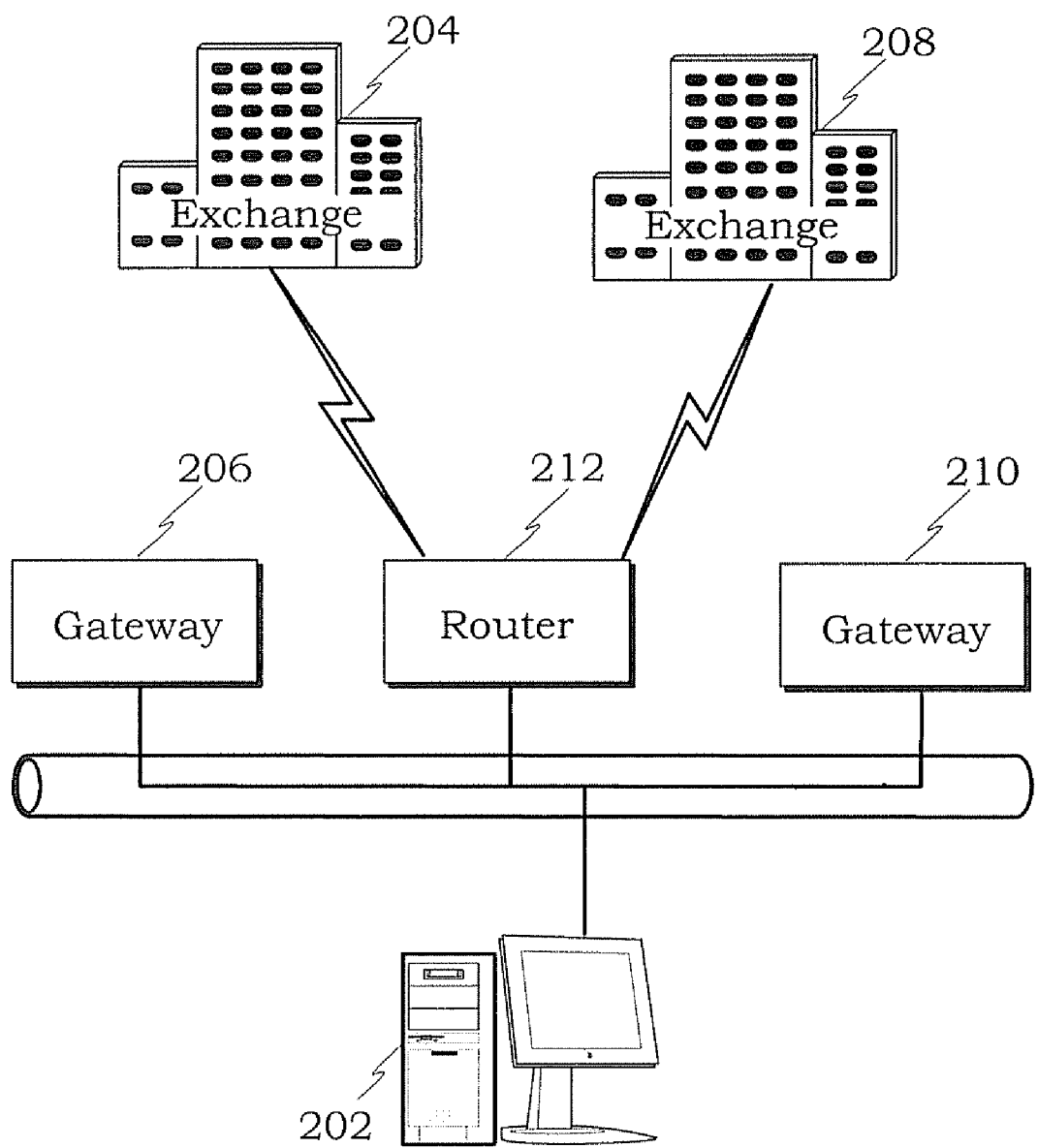
FIG. 2 illustrates another example electronic trading system for electronic trading according to the example embodiments, wherein this trading system includes a trading station where a trader can submit bids and offers for a tradeable object being traded at more than one electronic exchange.

FIG. 2 illustrates another example electronic trading system that uses similar computer elements as shown in FIG. 1, in which a trader may access and trade at multiple electronic exchanges. The system comprises a client device 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradeable objects listed at different electronic exchanges. To some traders, there can be many advantages with a multi-exchange environment. For example, a trader could view market information from each tradeable object through one common visual display. As such, price and quantity information from the two separate exchanges may be presented together so that the trader can view both markets simultaneously in the same window. In another example, a trader can spread trade different tradeable objects listed at the different electronic exchanges.

As indicated earlier, one skilled in the art of electronic trading systems will understand that the present embodiments are not limited to the particular configurations illustrated and described with respect to FIG. 1 and FIG. 2, and will be able to design a particular system based on the specific requirements (for example, by adding additional exchanges, gateways, client devices, routers, or other computers serving various functions like message handling and security). Additionally, several networks, like either of the networks shown in FIG. 1 or FIG. 2, may be linked together to communicatively access one or more electronic exchanges.

III. Client Device

Client devices 102 and 202 can be computers, such as a workstation, desktop, laptop, handheld device, and so forth, that allow a trader to trade one or more tradeable objects that are offered at exchange(s). A client device may include at least processor and memory. Preferably, the processor has enough processing power to handle and process various types of market information. The more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, or any other physical medium with patterns of holes, a RAM, a PROM, an EPROM, a FLASH-EPROM, and any other memory chip or cartridge, or any other medium from which a computer can read.

When a client device receives market information or other data, such as news, or charting data, and order related information from an exchange, the received information may be displayed to the trader(s) on the visual output device or display device. However, it should be understood that the information could be provided to a trader using other means such as sound. The output device can be any display device. For example, the display could be a CRT-based video display, an LCD-based or a gas plasma-based flat-panel display, a display that shows three-dimensional images, or some other type of display.

Upon viewing the market information or a portion thereof, a trader may wish to send orders to an exchange, cancel orders, change orders, query an exchange, and so on. To do so, the trader may input various commands or signals into a client device such as by typing into a keyboard, inputting commands through a mouse, or inputting commands or signals through some other input device. For instance, a trader may click a mouse button to initiate an order to buy a particular quantity of the tradeable object at a particular price. Then, a client device preferably generates transaction information. There are many different types of messages and/or order types that can be submitted, all of which may be considered various types of transaction information. Once generated, transaction information is sent from a client device to one or more host exchanges over communication links.

In one example embodiment, a client device uses software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, a client device could run automated types of trading applications.

IV. An Example Trading Station

Figure 3:
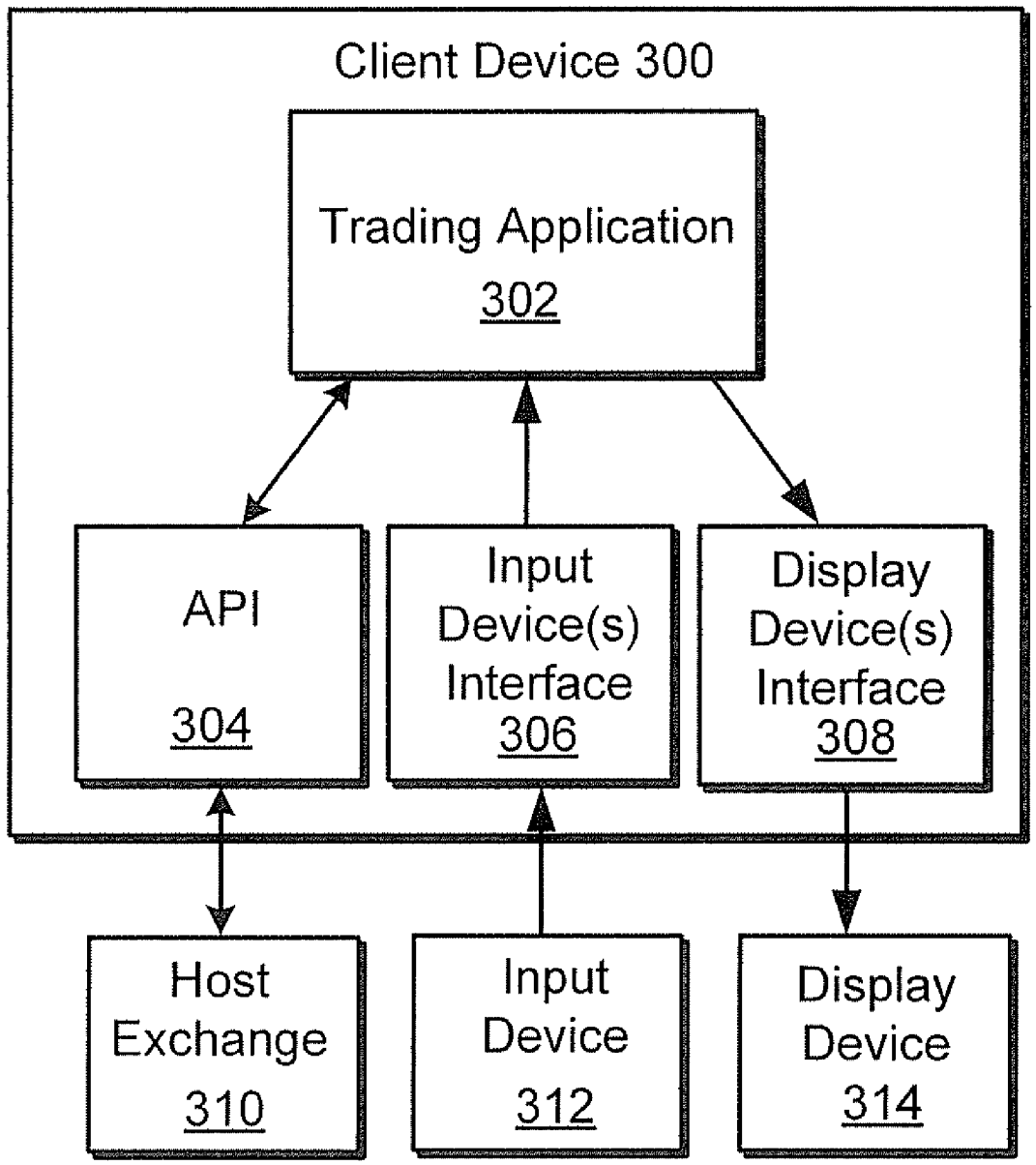
FIG. 3 illustrates an example trading station of either FIG. 1 or FIG. 2 where a user can submit bids and offers for a tradeable object being traded at one or more exchanges.

FIG. 3 illustrates an example trading station 300 which is similar to the type of trading stations 102 and 202 shown in FIGS. 1 and 2. Trading station 300 can be any particular type of computing device, examples of which were enumerated above. According to one example embodiment, trading station 300 has a trading application 302 stored in memory that when executed arranges and displays market information in many particular ways, usually depending on how the trader prefers to view the information. Trading application 302 may also implement an automated trading tool such as the automated spread trading tool that automatically sends orders into underlying legs to achieve a spread.

Preferably, trading application 302 has access to market information from one or more exchanges 310 through API 304 (or application programming interface), and trading application 302 can also forward transaction information to exchange 310 via API 304. Alternatively, API 304 could be distributed so that a portion of the API rests on the trading station 300 and a gateway, or at the exchange 3 10. Additionally, trading application 302 may receive signals from input device 312 via input device interface 306 and can be given the ability to send signals to display device 314 via display device interface 308.

Alternatively, the example embodiments described herein may be a separate program from trading application 302, but still stored in memory and executed on the trading station 300. In another alternative embodiment, the preferred embodiments may be a program stored in memory and executed on a device other than trading station 300. Example devices may include a gateway or some other well known intermediary device.

V. Automatic Spread Trading Overview

The example embodiments describe a system and methods for dynamically changing the quantity of orders in an electronic trading environment by use of an automated spread trading tool. It should be understood that the example embodiments are not limited to spreads, and could be easily used in relation to different trading strategies as well, in which dynamic changing of an order quantity would be useful.

According to one embodiment of an automated spread trading tool, a trader can select two or more individual tradeable objects, to create a "synthetic spread" that is sometimes referred hereinafter interchangeably as a "spread". Each tradeable object may be referred to as a "leg" of the spread. The automatic spread trading tool preferably generates spread data based on information in the legs and based on spread setting parameters, which may be configurable by a user. The spread data is communicated to a graphical user interface where it is displayed and where data corresponding to the legs of the spread may be displayed as well. At the client device, the user can enter orders in the spread window, and the automated spread trading tool will automatically work orders in the corresponding legs to achieve, or attempt to achieve (because the fill of the order is not always guaranteed) a desired spread.

Figure 4:
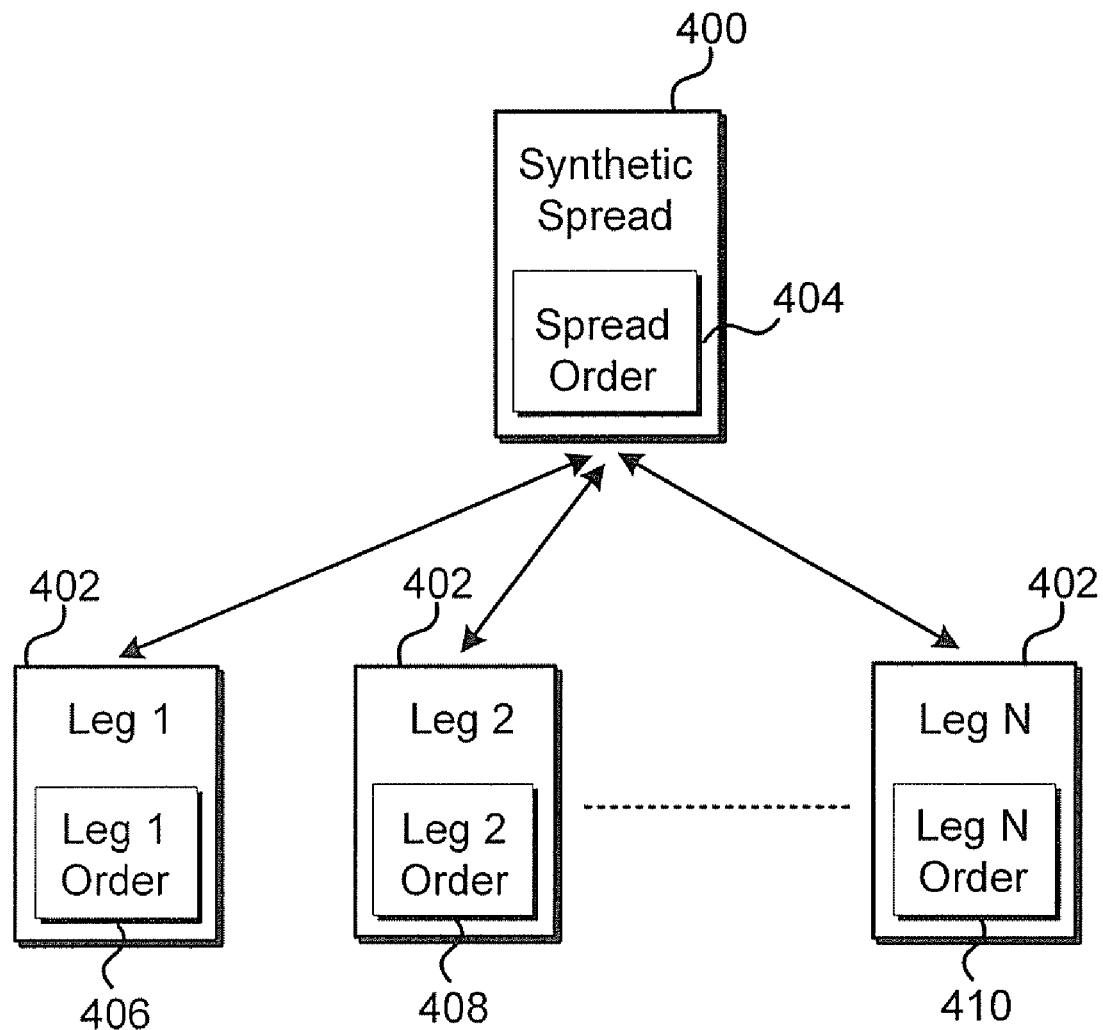
FIG. 4 is a block diagram illustrating an example relationship between a synthetically created spread and its underlying "N" number of legs.

FIG. 4 is a block diagram illustrating the relationship between a synthetically created spread 400, its underlying N legs 402, and a spread order 404 that has been entered. When a trader enters an order to buy or to sell the spread (e.g., represented as spread order 404) in a synthetic market, the automated spread trading tool automatically places orders in the appropriate legs to achieve or attempt to achieve the desired spread 404. For example, to achieve spread order 404, the automated spread trading tool may automatically enter orders 406, 408, 410 into the underlying legs 402. The automated spread trading tool may, among other things, calculate the quantities and prices for the orders 406, 408, 410 based on market conditions in the other legs and one or more parameters. It should be understood that an order to buy or sell the spread is simply an order price and an order quantity associated with the spread.

Using FIG. 4, let's assume that a spread order 404 has been entered into the market. When a trader enters an order to buy or to sell the spread (e.g., spread order 404) in a synthetic market, the automated spread trading tool automatically places orders in the appropriate legs to achieve or attempt to achieve the desired spread 404. For example, to achieve synthetic spread order 404, the automated spread trading tool may automatically enter orders 406, 408, . . . 410 into the underlying legs 402 (e.g., "Leg 1," "Leg 2," . . . "Leg N"). The automated spread trading tool may, among other things, calculate the quantities and prices for the orders 406, 408, 410 based on market conditions in the other legs and one or more parameters.

For example, according to one trading strategy, consider if "Leg 1 Order" 406 is a buy order, then the price of order 406 may be based on the best bid price of "Leg 2" and on the best bid price of each leg through "Leg N." In other words, the price of order 406 leans on the quantity associated with the best bid price of "Leg 2" though "Leg N." Of course, depending on the trading strategy, the price of order 406 might be based only on some of the legs and not on all N legs. Alternatively, other trading strategies may be used to determine the price and quantities of the orders. For example, the price of buy order 406 may lean on the quantity associated with the best ask price of "Leg 2" through "Leg N" (or on only some of the N legs). Of course, the order parameters of an order in one leg can lean on other types of market conditions in the other legs such as the last traded price (LTP), the last traded quantity (LTQ), a theoretical value, multiple quantities such as quantities closer to the inside market, or some other reference point.

When the leg orders are generated by the automated spread trading tool, they may be routed to one or more exchanges, depending on where the tradeable objects defined for the spread are traded. If the orders are not filled right away when they are received at the exchange(s), the orders are placed in order queues corresponding to the prices of each leg order.

According to the example embodiments, as the market conditions for each leg move, causing prices and quantities to change, the desired order quantity may be dynamically changed to reflect the change in the leaned on quantity.

VI. Dynamically Changing an Order Quantity

Figure 5:
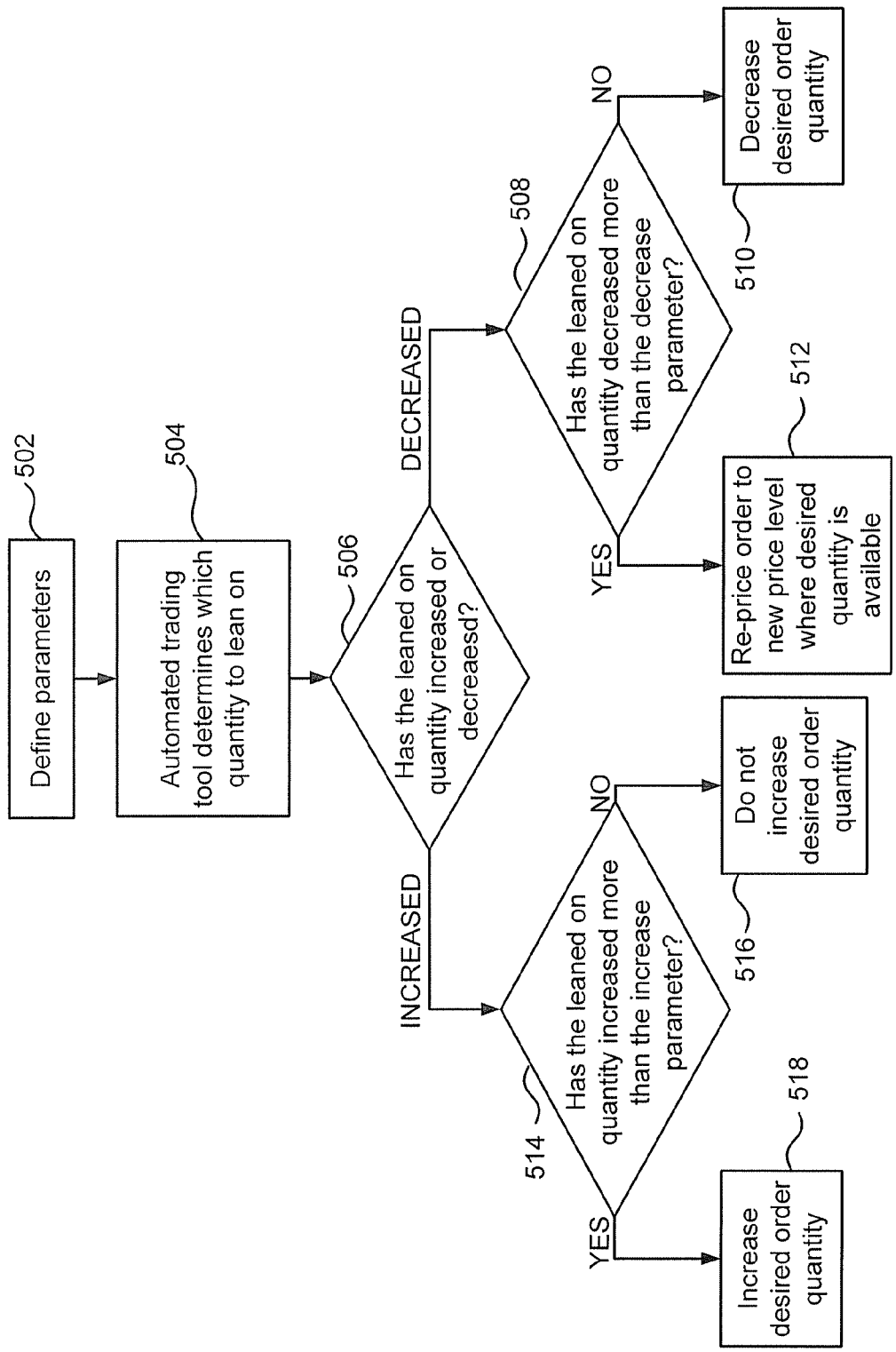
FIG. 5 is a flow chart illustrating an example method for dynamically changing an order quantity according to an example embodiment.

FIG. 5 is a flow chart illustrating an example method for dynamically changing an order quantity in electronic trading environment. It should be understood that the flow chart only shows the functionality and operation of a possible implementation of the present embodiments. In this regard, each block may represent a module, a segment, or a portion of the program code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

At step 502, the trader defines the parameters to determine when to dynamically change an order quantity. Specifically, the trader may define a decrease parameter, which defines how much the leaned on quantity may decrease before the order will be re-priced to a price level with sufficient quantity. It should be understood that a desired order quantity will decrease until the order is re-priced.

A trader may also define an increase parameter that defines how much the leaned on quantity must increase before the desired quantity may be dynamically increased. For example, if the increase in quantity does not meet the required amount then the desired quantity will remain at the same level. The increase parameter may be defined as a percentage or an integer value. As with the decrease parameter, the increase parameter may be defined as a percentage or an integer value.

In addition to the increase and decrease parameters, a trader may define a volume multiplier parameter and a spread ratio. The volume multiplier is used to check that sufficient leaned on quantity is available, and is more importantly used to lower the possible risk of getting "legged up." A spread ratio is defined as the amount of quantity that should be bought and sold for each leg of the spread to provide an equivalent amount of risk to the trader. For example, a trader may define a volume multiplier of "3" and a spread ratio of "3:2." A volume multiplier of "3", means that the leaned on quantity must be at least "3" times the amount of the trader's desired order quantity. A spread ratio of "3:2" means that the automated trading tool will buy "3" of leg A and will sell "2" in leg B in order to minimize risk to the trader.

The volume multiplier and the spread ratio work together to calculate the necessary quantity to lean on in leg B. Specifically, the leaned on quantity for leg B is determined using the following calculation:

Leaned on quantity=desired order quantity*ratio for leg B*volume multiplier

60=10*2*3

Based on the defined volume multiplier and spread ratio, if the trader's desired order quantity is "10", the automated trading tool must lean on a quantity that is at least "60" in leg B. If a higher volume multiplier is set, the trader's risk for getting "legged up" is often decreased. It should also be understood that the values for the volume multiplier and the spread ratio are user configurable, for example, the volume multiplier and the spread ratio could both be set to value of "1".

At step 504, the automated trading tool determines which price level in leg B has sufficient quantity available for the order in leg A to lean on based on the placement of a spread order through the automated trading tool and the volume multiplier and the spread ratio. The automated trading tool may place orders in the corresponding legs of the spread based on the desired price and quantity for the spread.

At step 506, the automated trading tool monitors the leaned on quantity in leg B until a change in quantity occurs. The automated trading tool determines if the leaned on quantity has increased or decreased.

At step 508, the automated trading tool detects that the leaned on quantity in leg B has decreased. Before dynamically decreasing the desired order quantity in leg A, the automated trading tool determines if the decrease in the leaned on quantity is greater than the defined decrease parameter, defined at step 502.

At step 510, the automated trading tool determines that the leaned on quantity has not decreased by a percentage or value greater than the defined decrease parameter. The automated trading tool will decrease the desired quantity to reflect the decreased leaned on quantity currently available in leg B. Dynamically decreasing the desired quantity in leg A gives the trader the opportunity for at least a portion of the order quantity to be filled at the desired price and to maintain the current queue position.

At step 512, the automated trading tool determines that the leaned on quantity has decreased by a percentage or value greater than the defined decrease parameter. In this instance, instead of decreasing the desired order quantity, the trader has determined that it is more worthwhile to lose the current queue position and re-price the order to a new price level where the majority of the desired quantity may be filled. When an order is re-priced, the leaned on quantity becomes the quantity associated with the new price level.

At step 514, the automated trading tool has determined that the leaned on quantity has increased. Before dynamically increasing the desired order quantity, the automated trading tool will determine if the increase in the leaned on quantity in leg B is greater than the defined increase parameter, defined at step 502.

At step 516, the automated trading tool determines that the leaned on quantity has not increased by a percentage or value greater than the defined increase parameter. The automated trading tool will not dynamically increase the desired quantity to reflect the increased leaned on quantity currently available, because the loss of queue position would not be as favorable for the trader as maintaining the current queue position and possibly getting filled at the desired order price.

At step 518, the automated trading tool determines that the leaned on quantity has increased by a percentage or value greater than the defined increase parameter. The automated trading tool will dynamically increase the desired quantity to reflect the increased leaned on quantity currently available in leg B. Although the trader will lose the current queue position, dynamically increasing the quantity could be more profitable to the trader as more quantity may get filled.

In an additional embodiment, the trader could limit the increase in the desired quantity to a maximum quantity increase or percentage increase. For example, as a risk parameter or a way to limit profit and loss, the trader may only be able to increase or decrease the desired parameter by a maximum percentage or amount. This limit parameter may also be configurable by the trader at step 502.

In an alternative embodiment, if the leaned on quantity in leg B has increased by a percentage or value greater than the defined increase parameter, the automated trading tool may leave the desired quantity at the desired price to maintain queue position and then submit another order for the difference in increased quantity. For example, if the increase in quantity was by "25%", then the automated trading tool may enter a separate order for the "25%" increase in quantity instead of deleting the initial order, losing queue position, and then submitting another order for the desired order quantity plus the "25%" quantity increase.

VII. Examples of Dynamically Changing an Order Quantity

Figure 6:
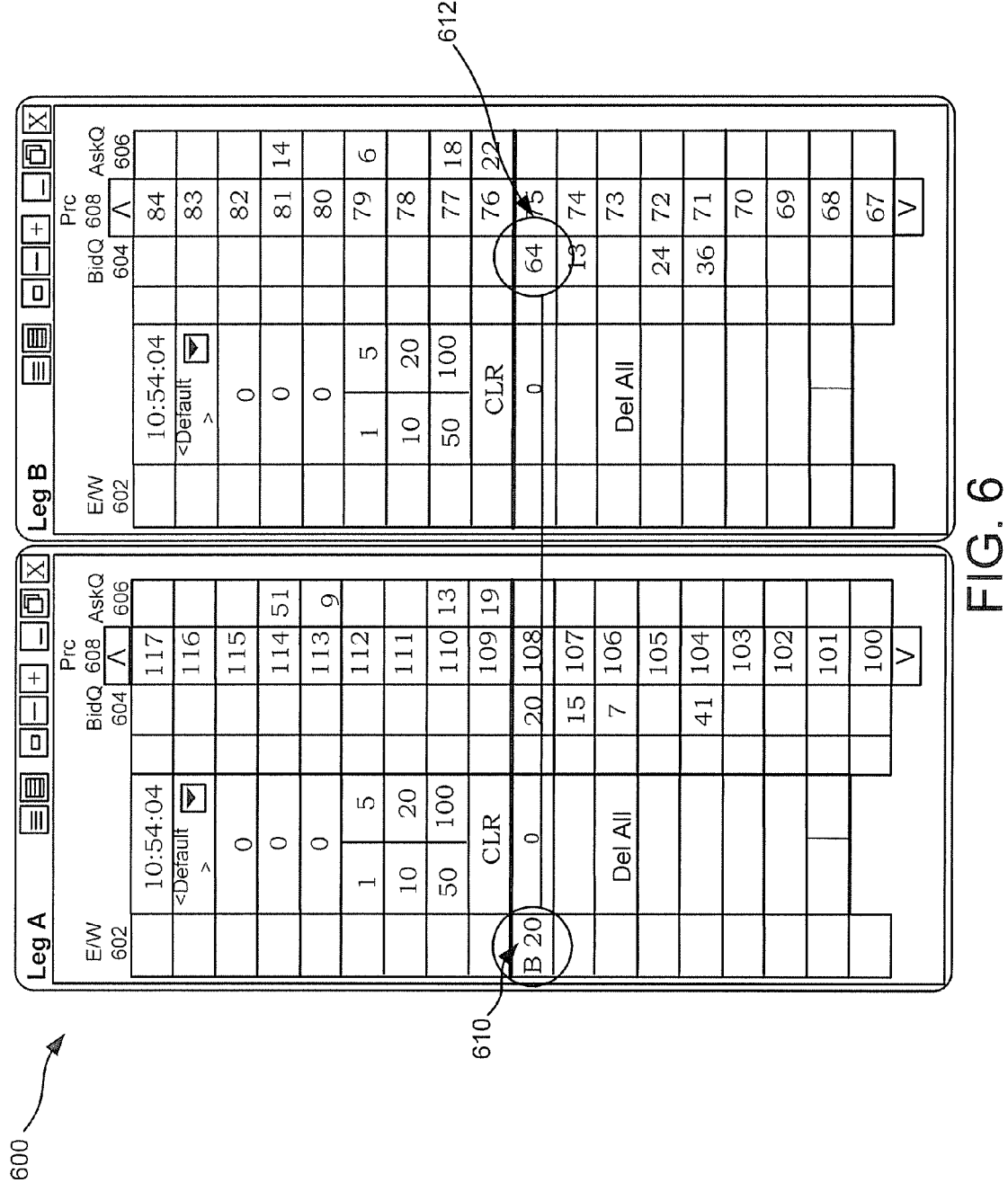
FIG. 6 is a block diagram illustrating a trading screen of the legs involved in a spread trading strategy in an electronic trading environment.

FIG. 6 is a block diagram illustrating trading screens associated with the legs of a spread trading strategy. Specifically, FIG. 6 includes the trading screens 600 associated with the legs of the spread which display a working quantity column 602, bid quantity column 604, ask quantity column 606, price column 608, working order 610, and the leaned on quantity in leg B 612. The working quantity column 602 displays desired orders to buy or sell the leg A or leg B. The bid quantity column 604 displays buy order quantities available in relation to certain price levels in price column 608. The ask quantity column 606 displays offer order quantities available in relation to certain price levels in price column 608. The price column 608 displays the price levels associated with leg A and leg B. The working order 610 displays an order that was entered by the automated trading tool. Based on the best bid price in leg B, working order 610 was entered at the price of "108" in leg A.

According the example embodiments, before submitting working order 610, the automated trading tool determined that the best bid price in leg B had sufficient quantity to meet the desired order quantity of working order 610, which is a quantity of "64." As previously explained, the automated trading tool uses the desired order quantity, the volume multiplier, and the spread ratio together to determine the quantity that must be available to lean on in leg B. Specifically, the desired order quantity 610 is "20" and let's assume that the volume multiplier was defined as "3" and the spread ratio was defined as "1:1". Based on the following calculation: "20*1*3=60", there must be a minimum quantity of "60" available to lean on in leg B. As shown in FIG. 6, a leaned on quantity of "64" is available, shown at 612, and a working order is placed at 610.

A. Decreasing an Order Quantity

Figure 7:
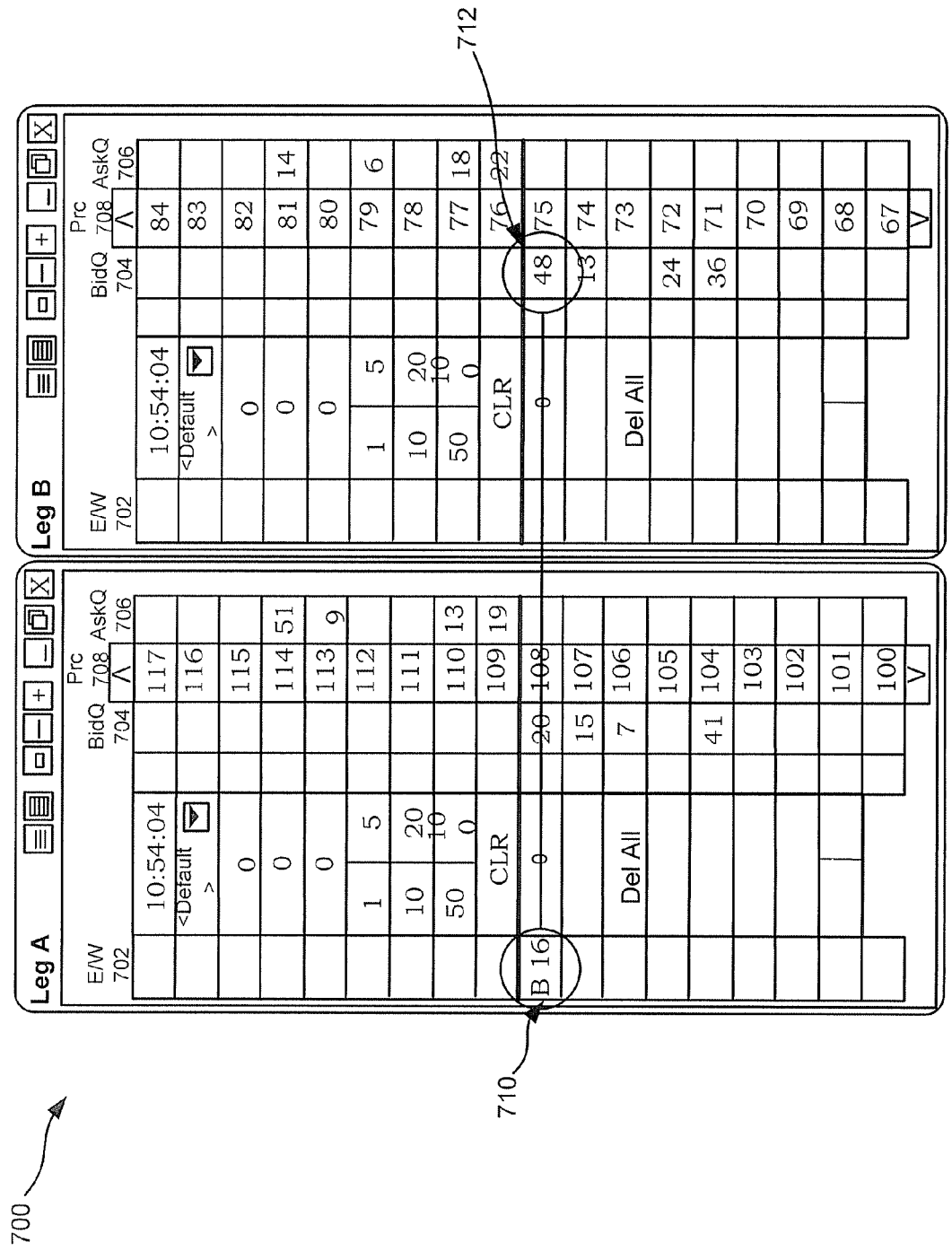
FIG. 7 is a block diagram illustrating a trading screen that demonstrates an example method for dynamically decreasing an order quantity according to an example embodiment.

FIG. 7 is a block diagram illustrating the same trading screens as displayed in FIG. 6 at a later time. FIG. 7 specifically displays the order quantity associated with working order 710 as dynamically decreased based on the decrease in the leaned on quantity in leg B 712. The leaned on quantity in leg B decreased from a quantity of "64," shown in FIG. 6, to a quantity of "48," shown in FIG. 7. Based on the example method in FIG. 5, the automated trading tool will determine if the leaned on quantity 712 has decreased by more than the user-defined decrease parameter. Let us assume that the decrease parameter has been defined as a percentage of 25%. A decrease parameter of 25% means that the leaned on quantity, shown at 712, can decrease between 0-25% for the working order, shown at 710, to remain at the desired price level of "108." As shown in FIG. 7, the leaned on quantity 712 has decreased a total of 25% which is equal to the user-defined decrease parameter of 25%. According to the example embodiments, the quantity associated with working order 710 will be decreased to "16" and the desired order price and queue position will be maintained.

B. Increasing an Order Quantity

Figure 8:
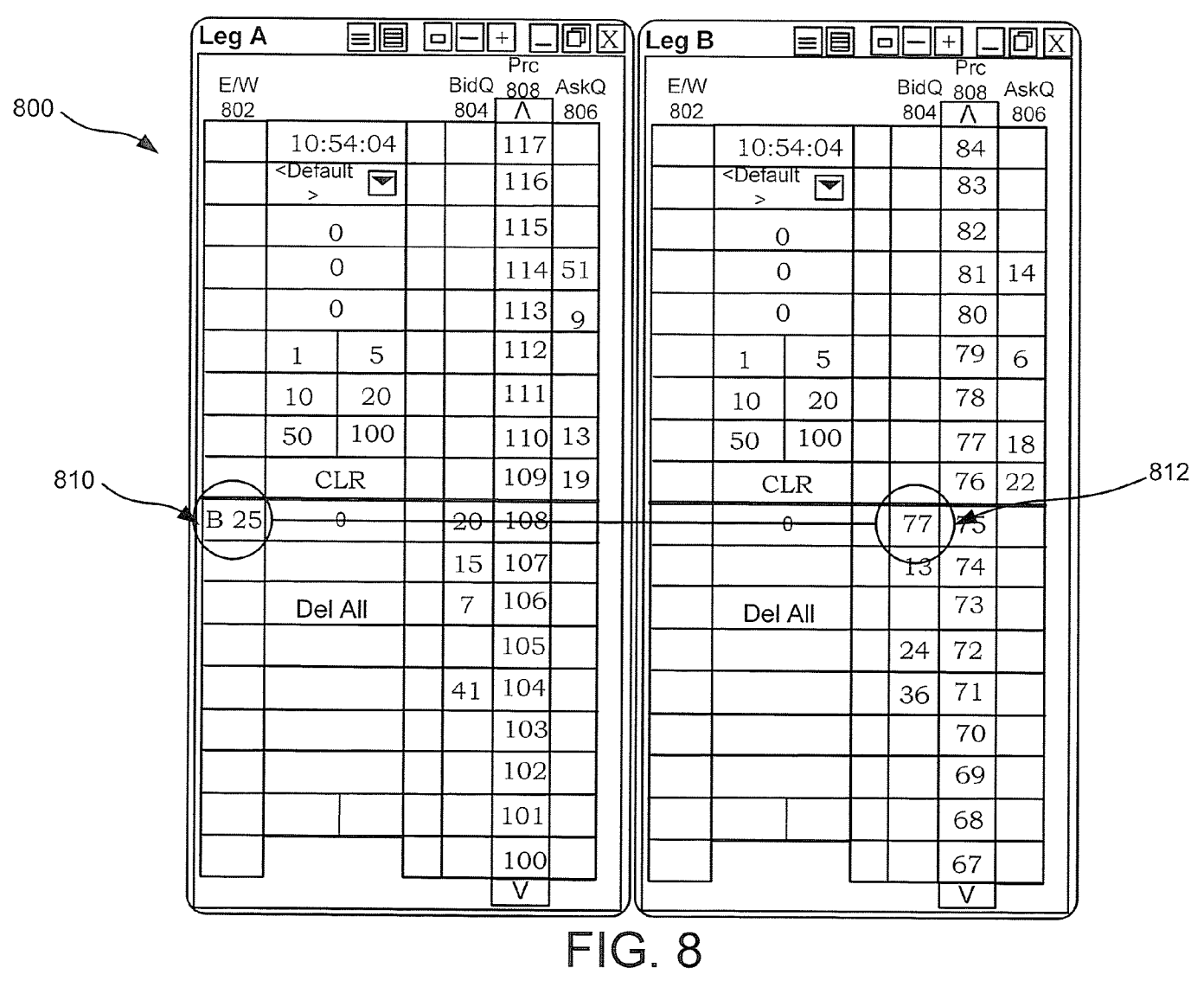

FIG. 8 is a block diagram illustrating the same trading screens as displayed in FIG. 6 and FIG. 7 at a later time. FIG. 8 specifically displays the order quantity associated with working order 810 as dynamically increased based on the increase in the leaned on quantity in leg B 812. The leaned on quantity in leg B increased from a quantity of "48" shown in FIG. 8, to a quantity of "77" shown in FIG. 7. Based on the described method in FIG. 5, the automated trading tool will determine if the leaned on quantity 812 has increased by more than the user-defined increase parameter. Let us assume that the increase parameter has been defined as a percentage of 50%. An increase parameter of 50% means that the leaned on quantity, shown at 712, must increase by at least 50% above the desired quantity associated with working order, shown at 810, before the desired quantity is increased.

As shown in FIG. 8, the leaned on quantity 812 has increased by more than the defined increase parameter of 50%, from a quantity of "48" to "77." According to the example embodiments, the desired quantity associated with working order 810 will be increased to the quantity level that reflects the leaned on quantity, however the queue position will not be maintained.

It should be understood that the desired quantity associated with the working order 810 will be increased to "25" based on the defined volume multiplier parameter. Specifically, there must be at least "3" times the desired order quantity at the leaned on quantity 812. Since the leaned on quantity 812 is "77", the desired order quantity is increased to "25" which is rounded down from a quantity of "25.667" based on the "77/3" calculation. If the result was rounded up, the desired order quantity would be "26", however "26×3=78", and there is not sufficient leaned on quantity for the desired order quantity to be "26."

In an additional embodiment, the automated trading tool may dynamically decrease the desired order quantity before placing the initial order in leg A. Specifically, if a lesser quantity is available to lean on, the desired order quantity may be decreased upon placement of the initial order.

In another additional embodiment, the automated trading tool may check if there is any quantity at price levels closer to the inside market before placing the initial order in leg A. If so, the automated trading tool may determine if it would be worthwhile to decrease the desired order quantity and lean on a different quantity in leg B. If a decreased quantity is available to lean on at a different price, then the automated trading tool may decrease the initial desired quantity and place the order in leg B at a better price with sufficient quantity to lean on.

CONCLUSION

The example embodiments discussed above describe system and methods for dynamically changing a trade order quantity as an attempt to maintain the desired order price and order queue position. To determine if the desired order quantity should be decreased or increased, the example embodiments allow a trader to define of set of parameters. These parameters, specifically an increase and a decrease parameters, are used to determine if and by how much a desired quantity may be dynamically changed while electronic trading. The trader may also define a volume multiplier parameter that may be used as a way to determine that a specific level of quantity be available to lean on.

Once the increase and decrease parameters are defined, the example embodiments compare the leaned on quantity to the desired order quantity. Based on the results of comparison, the automated trading tool may dynamically increase or decrease the desired order quantity.

The above description of the example embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for dynamically determining quantity for risk management may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for dynamically changing a trade order quantity in an electronic trading environment, comprising:
    receiving via a computing device a definition for a trading strategy comprising a first tradeable object and a second tradeable object;
    receiving via the computing device a decrease parameter;
    receiving via the computing device a desired price and a desired quantity to buy or sell the trading strategy;
    upon receiving the desired price and the desired quantity for the trading strategy, automatically placing via the computing device a first trade order for the first tradeable object having an order quantity, wherein, based on the definition for the trading strategy, the desired price, the desired quantity, and market data for the second tradeable object, the first trade order leans on a quantity in the second tradeable object;
    detecting via the computing device a change in the leaned on quantity in the second tradeable object; and sending via the computing device a command to decrease the order quantity of the first trade order for the first tradeable object based on the change in the leaned on quantity in the second tradeable object according to the trading strategy when the detected change is a decrease in the leaned on quantity and the decrease conforms to the decrease parameter.

2. The method of claim 1, wherein the decrease parameter is defined as a percentage value.

3. The method of claim 1, wherein the decrease parameter is defined as an integer value.

4. The method of claim 1, wherein the decrease parameter is based on one or more defined risk parameters.

5. The method of claim 1, further comprising:
comparing via the computing device the decreased leaned on quantity in the second tradeable object to the decrease parameter;
determining via the computing device that the decrease conforms to the decrease parameter when the leaned on quantity in the second tradeable object decreased by less than or equal to the decrease parameter;
determining via the computing device that the decrease does not conform to the decrease parameter when the leaned on quantity in the second tradeable object decreased more than the decrease parameter; and
sending via the computing device a command to re-price the first trade order for the first tradeable object to a price level where sufficient quantity is available to lean on in the second tradeable object when the decrease does not conform to the decrease parameter.

6. The method of claim 1, further comprising:
receiving via the computing device an increase parameter; and
sending via the computing device a command to increase the order quantity of the first trade order for the first tradeable object based on the change in the leaned on quantity in the second tradeable object according to the trading strategy when the detected change is an increase in the leaned on quantity and the increase conforms to the increase parameter.

7. The method of claim 6, wherein the increase parameter is defined as a percentage value.

8. The method of claim 6, wherein the increase parameter is defined as an integer value.

9. The method of claim 6, wherein the increase parameter is based on one or more defined risk parameters.

10. The method of claim 6, further comprising:
comparing via the computing device the increased leaned on quantity in the second tradeable object to the increase parameter;
determining via the computing device that the increase conforms to the increase parameter when the leaned on quantity in the second tradeable object increased by more than or equal to the increase parameter; and
determining via the computing device that the increase does not conform to the increase parameter when the leaned on quantity in the second tradeable object increased less than the increase parameter and if so, maintaining the current order quantity of the first trade order for the first tradeable object.

11. The method of claim 6, wherein the command to increase the order quantity of the first trade order comprises commands to cancel the first trade order and submit a second trade order with a quantity based on the definition for the trading strategy and leaning on the increased leaned on quantity.

12. The method of claim 6, wherein the command to increase the order quantity of the first trade order comprises a command to place a second trade order for the first tradeable object with a quantity based on the definition for the trading strategy and the increase in the leaned on quantity.

13. The method of claim 1, wherein the definition for the trading strategy further comprises a volume multiplier parameter, wherein the leaned on quantity in the second tradeable object is determined based on a quantity available in the second tradeable object and the volume multiplier parameter.

14. The method of claim 13, further comprising:
calculating via the computing device a minimum leaned on quantity in the second tradeable object by multiplying the order quantity of the first trade order for the first tradeable object by the volume multiplier parameter and a spread ratio.

15. The method of claim 13, wherein the volume multiplier parameter is defined as an integer value.

16. The method of claim 1, further comprising:
determining if a lesser quantity is available to lean on in the second tradeable object prior to placing the first trade order for the first tradeable object; and if so
decreasing the order quantity of the first trade order for the first tradeable object.

17. The method of claim 1, further comprising:
checking a plurality of price levels closer to an inside market of the second tradeable object prior to placing the first trade order for the first tradeable object;
determining if lesser quantity is available to lean on at one of the plurality of price levels closer to the inside market of the second tradeable object; and if so
decreasing the order quantity of the first trade order for the first tradeable object prior to placing the first trade order in the first tradeable object.

18. The method of claim 17, wherein the inside market comprises a highest bid price and a lowest ask price currently available in the market.

19. The method of claim 1, further comprising:
displaying via a client device the decreased order quantity in relation to an indicator for the first trade order for the first tradeable object.

20. A non-transitory computer readable medium having stored therein instructions executable by a processor to perform the following method steps:
receiving via a computing device a definition for a trading strategy comprising a first tradeable object and a second tradeable object;
receiving via the computing device a decrease parameter;
receiving via the computing device a desired price and a desired quantity to buy or sell the trading strategy;
upon receiving the desired price and the desired quantity for the trading strategy, automatically placing via the computing device a first trade order for the first tradeable object having an order quantity, wherein, based on the definition for the trading strategy, the desired price, the desired quantity, and market data for the second tradeable object, the first trade order leans on a quantity in the second tradeable object;
detecting via the computing device a change in the leaned on quantity in the second tradeable object; and
sending via the computing device a command to decrease the order quantity of the first trade order for the first tradeable object based on the change in the leaned on quantity in the second tradeable object according to the trading strategy when the detected change is a decrease in the leaned on quantity and the decrease conforms to the decrease parameter.

21. The computer readable medium of claim 20, wherein the decrease parameter is defined as a percentage value.

22. The computer readable medium of claim 20, wherein the decrease parameter is defined as an integer value.

23. The computer readable medium of claim 20, wherein the decrease parameter is based on one or more defined risk parameters.

24. The computer readable medium of claim 20, further comprising instructions for:
 comparing via the computing device the decreased leaned on quantity in the second tradeable object to the decrease parameter;
 determining via the computing device that the decrease conforms to the decrease parameter when the leaned on quantity in the second tradeable object decreased by less than or equal to the decrease parameter;
 determining via the computing device that the decrease does not conform to the decrease parameter when the leaned on quantity in the second tradeable object decreased more than the decrease parameter; and
 sending via the computing device a command to re-price the first trade order for the first tradeable object to a price level where sufficient quantity is available to lean on in the second tradeable object when the decrease does not conform to the decrease parameter.

25. The computer readable medium of claim 20, further comprising instructions for:
 receiving via the computing device an increase parameter; and
 sending via the computing device a command to increase the order quantity of the first trade order for the first tradeable object based on the change in the leaned on quantity in the second tradeable object according to the trading strategy when the detected change is an increase in the leaned on quantity and the increase conforms to the increase parameter.

26. The computer readable medium of claim 25, wherein the increase parameter is defined as a percentage value.

27. The computer readable medium of claim 25, wherein the increase parameter is defined as an integer value.

28. The computer readable medium of claim 25, wherein the increase parameter is based on one or more defined risk parameters.

29. The computer readable medium of claim 25, further comprising instructions for:
 comparing via the computing device the increased leaned on quantity in the second tradeable object to the increase parameter;
 determining via the computing device that the increase conforms to the increase parameter when the leaned on quantity in the second tradeable object increased by more than or equal to the increase parameter; and
 determining via the computing device that the increase does not conform to the increase parameter when the leaned on quantity in the second tradeable object increased less than the increase parameter and if so, maintaining the current order quantity of the first trade order for the first tradeable object.

30. The computer readable medium of claim 25, wherein the command to increase the order quantity of the first trade order comprises commands to cancel the first trade order and submit a second trade order with a quantity based on the definition for the trading strategy and leaning on the increased leaned on quantity.

31. The computer readable medium of claim 25, wherein the command to increase the order quantity of the first trade order comprises a command to place a second trade order for the first tradeable object with a quantity based on the definition for the trading strategy and the increase in the leaned on quantity.

32. The computer readable medium of claim 20, wherein the definition for the trading strategy further comprises a volume multiplier parameter, wherein the leaned on quantity in the second tradeable object is determined based on a quantity available in the second tradeable object and the volume multiplier parameter.

33. The computer readable medium of claim 32, further comprising instructions for:
 calculating via the computing device a minimum leaned on quantity in the second tradeable object by multiplying the order quantity of the first trade order for the first tradeable object by the volume multiplier parameter and a spread ratio.

34. The computer readable medium of claim 32, wherein the volume multiplier parameter is defined as an integer value.

35. The computer readable medium of claim 20, further comprising instructions for:
 determining if a lesser quantity is available to lean on in the second tradeable object prior to placing the first trade order for the first tradeable object; and if so
 decreasing the order quantity of the first trade order for the first tradeable object.

36. The computer readable medium of claim 20, further comprising instructions for:
 checking a plurality of price levels closer to an inside market of the second tradeable object prior to placing the first trade order for the first tradeable object;
 determining if lesser quantity is available to lean on at one of the plurality of price levels closer to the inside market of the second tradeable object; and if so
 decreasing the order quantity of the first trade order for the first tradeable object prior to placing the first trade order in the first tradeable object.

37. The computer readable medium of claim 36, wherein the inside market comprises a highest bid price and a lowest ask price currently available in the market.

38. The computer readable medium of claim 20, further comprising instructions for:
 displaying via a client device the decreased order quantity in relation to an indicator for the first trade order for the first tradeable object.

\* \* \* \* \*

UNITED STATES PATENT AND TRADEMARK OFFICE
CERTIFICATE OF CORRECTION

| | | |
|---|---|---|
| PATENT NO. | : 7,729,978 B2 | Page 1 of 1 |
| APPLICATION NO. | : 11/692284 | |
| DATED | : June 1, 2010 | |
| INVENTOR(S) | : Mintz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 152 days.

Signed and Sealed this

Eighteenth Day of January, 2011

David J. Kappos
*Director of the United States Patent and Trademark Office*